United States Patent Office 2,728,763
Patented Dec. 27, 1955

2,728,763

PREPARATION OF BENZIMIDAZOLE GLYCOSIDES

Patrick Mamalis, Vladimir Petrow, and Bennett Sturgeon, London, England, assignors to The British Drug Houses Limited, London, England, a British company No Drawing. Application July 9, 1951,
Serial No. 235,904

Claims priority, application Great Britain July 13, 1950

8 Claims. (Cl. 260—211.5)

This invention is for improvements in or relating to the manufacture of heterocyclic compounds and has for one of its objects the manufacture of compounds which are useful as intermediates in the preparation of valuable therapeutic substances.

It is a further object of the invention to produce benzimidazole glycosides of the general formula

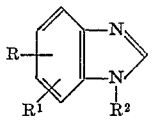

where R and $R^1$ are H or an alkyl grouping of molecular weight not exceeding 43 and $R^2$ is a sugar having in its molecular formula the group an acylated glycosido linkage, such as $CHOH(CHOH)_n.CH_2OH$, $n$ being not greater than 4. The $R^2$ grouping may exist in the "anhydro" or "ether" form as a furano- or pyrano-sugar, and the open chain, furano and pyrano forms of the sugar are to be understood as being within the scope of the present invention.

According to the present invention there is provided a process for the manufacture of a benzimidazole glycoside of the above-mentioned general formula, which process comprises reacting an o-phenylenediamine of the general formula

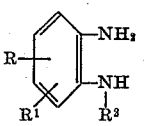

(where R, $R^1$ and $R^2$ have the same meaning as above) with an alkyl orthoformate to give an alkyl isoformanilide of the general formula

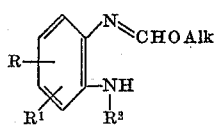

(where R, $R^1$ and $R^2$ have the same meaning as above) and thereafter reacting the iso-formanilide with a source of hydrogen ions to effect ring closure and form the benzimidazole glycoside.

Ethyl orthoformate is the perferred orthoformate.

The preferred source of hydrogen ions is dilute hydrochloric acid. Certain pentosides however are more conveniently converted into the benzimidazole pentosides by ring closure with picric acid, preferably present in stoichiometric excess when the picrate of the desired benzimidazole is precipitated.

The sugar residue may be derived from a hexose or pentose, in the pyrano or furano forms.

The hydroxyl groups may be protected by acetylation during the reaction and subsequently restored by deacetylation; alternatively in certain instances, particularly in the case of the furanopentosides, it may be advantageous to employ such derivatives as the trityl, benzyl, toluene sulphonyl or diphenylphosphoryl to protect the terminal hydroxyl group and in addition, if necessary, to protect some or all of the remaining hydroxyl groups by acetylation or by conversion into such derivatives as isopropylidene or benzylidene.

The reaction of the present invention is preferably carried out by heating under reflux with ethyl orthoformate which may be present in excess.

The ethyl orthoformate may be dissolved in an inert solvent such as alcohol, ethyl acetate or benzene.

The present invention is particularly applicable to the formation of benzimidazole glycosides containing a methyl group in the 5-position or methyl groups in the 5- and 6-positions and in which the sugar residue is derived from ribose.

The method is illustrated in the following reaction scheme which describes also the preparation of the o-phenylene diamine starting material.

5-nitro-o-4-xylidine and glucose may be combined in boiling alcoholic solution in the presence of ammonium chloride following the method of Kuhn and Strobele (Ber., 1937, 70, 747) to give two isomeric glycosides, 5-nitro-o-4-xylidine-d-glucoside:

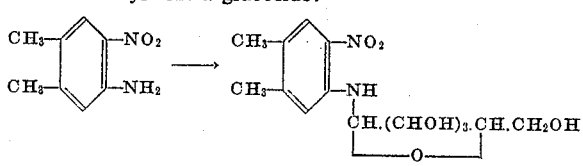

The sugar derivative may next be acetylated, for example by the use of acetic anhydride in pyridine solution to give two 5-nitro-o-4-xylidine-d-tetraacetyl glycopyranosides.

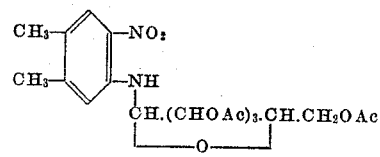

The tetraacetyl compound, 5-amino-o-4-xylidine-d-tetraacetyl glucopyranoside

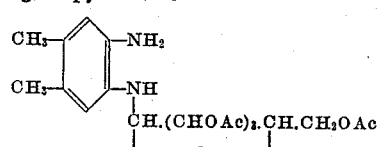

may be formed by catalytic reduction and may then be refluxed with excess ethyl orthoformate to form 5-ethoxy-methyleneamino-o-4-xylidine-d-tetraacetylglucopyranoside

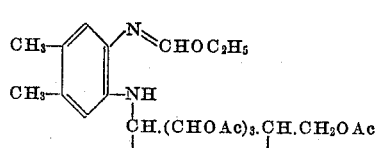

The ethyl isoformanilides of the above type are not in general obtained in the crystalline form.

Ring closure may next be effected with dilute hydrochloric acid (0.05–0.1 N) at 100° C. to form 5:6-dimethylbenzimidazole-1β-d-tetraacetyl glucopyranoside

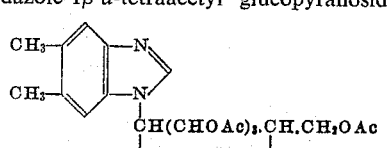

Hydrolysis may be conveniently carried out with 2 N to 6 N hydrochloric acid at 100° C. giving the hydrochloride of the glycoside. By allowing a solution of the hydrochloride to percolate through the ion-exchange resin "Deacidite" (a polyamine anion exchange resin), the free glycoside may be obtained:

5:6-dimethylbenzimidazole-1β-glucopyranoside

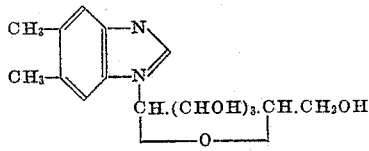

The intermediate compounds in the above reaction scheme need not be isolated.

Following is a description by way of example of methods of carrying the invention into effect:

*Example I* o-Nitroaniline tetraacetyl-*d*-glucoside (5 g. Kuhn and Strobele, Ber., 1937, 70, 781) in ethyl acetate (100 ml.) was reduced catalytically at 40–50° C., employing a palladium charcoal catalyst, and the solution, after filtration, was treated with ethyl orthoformate (8 ml.) and then slowly evaporated on the steam-bath during 3–4 hrs. Removal of excess ethyl o-formate under reduced pressure gave 2-ethoxymethylene-o-phenylenediamine-*d*-tetraacetylglucopyranoside as fine needles from benzene/light petroleum (B. Pt. 80/100° C.) M. Pt. 141–142° C., $[\alpha]_D^{20} = -84.6°$.

The foregoing compound (5 g.; crude) was heated with N/10 hydrochloric acid (30 ml.) water (15 ml.) and a few drops of spirit for 15 mins. at 100° C. Benzimidazole-1β-*d*-tetraacetylglucopyranoside (2.5 g.) separated on cooling and formed feathery needles, M. Pt. 151–152° C. $[\alpha]_D^{22} = -22.8°$ after crystallization from ethyl acetate/light petroleum. The picrate separated from spirit in felted yellow needles, M. Pt. 170–171° C.

The foregoing tetraacetate (2.5 g.) was heated with 6N hydrochloric acid (90 ml.) for 3 hrs. at 100° C. The solution was concentrated under reduced pressure until separation of solids began, when acetone was added. Benzimidazole-1β-*d*-glucopyranoside hydrochloride separated on cooling, as needles from water-acetone M. Pt. 196° (with foaming) $[\alpha]_D^{25} = +17.3°$.

Passage of an aqueous solution of the hydrochloride through a basic ion exchange resin (such as "Amberlite IR–4B") followed by evaporation of the eluate to dryness gave benzimidazole-1-β-*d*-glucopyranoside, as fine needles from absolute alcohol, M. Pt. 212–213° C. $[\alpha]_D^{22} = -3.4°$.

*Example II* o-Nitroaniline (8 g.), *d*-xylose (5 g.) and ammonium chloride (500 mg.) were heated under reflux in dry ethanol (60 ml.) for 2 hours. The solution was concentrated and then poured into a column of alumina. Excess o-nitroaniline was removed by washing with benzene and the product eluted with aqueous alcohol (1:1). o-Nitroaniline-*d*-xyloside was obtained by evaporation of the alcoholic eluate; yellow prisms from ethanol/light petroleum. M. Pt. 172–176° C. The compound is a mixture of the α and β-isomers.

The foregoing nitroamine was converted into the triacetate by the method of Kuhn and Strobele (see Example I). The latter (1.4 g.) was reduced catalytically in ethyl acetate solution in the presence of a palladium charcoal catalyst. The filtrate was treated with ethyl orthoformate (5 ml.) and the mixture evaporated on the steam bath for 2 hrs. The residue was taken to dryness under reduced pressure and the resulting resin heated with N/10 hydrochloric acid (8 ml.) at 100° C. for 10 mins. The product, isolated with chloroform, was treated with alcoholic picric acid giving benzimidazole-1β-triacetyl-*d*-xylopyranoside picrate, flat yellow needles from alcohol, M. Pt. 192–193° C.

The foregoing picrate was decomposed by passing its chloroform solution through a column of alumina. Evaporation of the eluate gave benzimidazole-1β-triacetyl-*d*-xylopyranoside, cubes from chloroform/light petroleum, M. Pt. 163° C. $[\alpha]_D^{25} = -44.8°$.

Hydrolysis of the foregoing triacetate (700 mg.) with 6N hydrochloric acid (20 ml.) for 2 hrs. at 100° C. gave benzimidazole - 1β - *d* - xylopyranoside hydrochloride hydrate, as needles from water/acetone, M. Pt. 148–150° C. $[\alpha]_D^{24.6} = -25.4°$.

An aqueous solution of the foregoing hydrochloride was allowed to percolate through a column of "Deacidite." The filtrate and washing were taken to dryness giving benzimidazole-1β-*d*-xylopyranoside as plates from benzene/alcohol, M. Pt. 237–238° C. $[\alpha]_D^{21} = -89.1°$.

*Example III*

3-nitro-p-toluidine (8 g.) was condensed with *d*-xylose (5 g.) in alcohol (100 ml.) containing ammonium chloride (500 mg.) to give a mixture of 3-nitro-p-toluidine-*d*-xylosides, M. Pt. about 172° C. These were separated by extraction with water into: 3-nitro-p-toluidine-*d*-xyloside I, felted orange needles from water, M. Pt. 158–159° C., and a small quantity of 3-nitro-p-toluidine-*d*-xyloside II, orange red needles from aqueous alcohol, M. Pt. 192° C.

Acetylation of the crude mixture of *d*-xylosides with acetic anhydride/pyridine gave 3-nitro-p-toluidine-triacetyl-*d*-xylopyranoside I, fluffy yellow needles from alcohol, M.Pt. 183° C. $[\alpha]_D^{23} = -87.2°$.

The mother liquors on concentration and strong cooling gave 3-nitro-p-toluidine-triacetyl-*d*-xylopyranoside II, purified from alcohol, M.Pt. 130–132° C. $[\alpha]_D^{26} = +7.9°$.

The foregoing nitro-base (Compound I or II) (2 g.) was reduced catalytically as before and the ethyl acetate solution of the diamine evaporated slowly in the water bath for 3 hrs. with ethyl orthoformate (6 ml.). After taking to dryness under reduced pressure the residue was dissolved in N/10 hydrochloric acid (10 ml.) sufficient alcohol being added to effect solution, and the mixture heated at 100° C. for 10 mins. The product, isolated with chloroform, was converted into the picrate giving 5-methylbenziminadole-1-triacetyl-*d*-xylopyranoside picrate, fine yellow needles from alcohol, M.Pt. 206° C. Filtration of its chloroform solution through alumina gave 5-methylbenzimidazole-1-triacetyl-*d*-xylopyranoside, needles from benzene/light petroleum, M.Pt. 183° C. $[\alpha]_D^{23} = -67°$.

When the foregoing triacetate (500 mg.) was heated with 6 N hydrochloric acid (30 ml.) at 100° C. for 2 hrs., the mixture taken to dryness, and the aqueous solution of the residue filtered through "Deacidite," 5-methylbenzimidazole-1-*d*-xylopyranoside was obtained as fine felted needles from alcohol, M.Pt. 215–216° C. $[\alpha]_D^{20} = -50.7°$.

*Example IV*

Condensation of 3-nitro-p-toluidine with *d*-glucose gave 3-nitro-p-toluidine-*d*-glucoside, golden yellow needles from water, M.Pt. 120–128°. This product was probably a mixture of isomers and was acetylated by adding acetic anhydride (25 ml.) to its solution in pyridine (5 g. in 80 ml.) at room temperature. After 24 hrs. alcohol (25 ml.) was added and the mixture allowed to stand for a further hour at room temperature. It was then taken to dryness under reduced pressure and the residue repeatedly evaporated with alcohol. The solid (7 g.) was crystallised from alcohol giving 3-nitro-p-toluidine-tetraacetyl-*d*-glucopyranoside I, yellow needles or prisms, M.Pt. 180° $[\alpha]_D^{22.5} = -51.7°$.

The alcoholic mother liquors, on further concentration followed by cooling, deposited 3-nitro-p-toluidinetetraacetyl-d-glucopyranoside II which was purified from alcohol, M.Pt. 129° C. $[\alpha]_D^{22.5°} = +107.7°$.

Catalytic reduction of either isomer gave 3-amino-p-toluidine-tetraacetyl-d-glucopyranoside, needles from benzene/light petroleum, M.Pt. 130–131° C. $[\alpha]_D^{23°} = -47°$.

Reaction of this compound with ethyl orthoformate followed by treatment with N/10 hydrochloric acid at 100° for 30 mins. and by conversion to the picrate gave 5 - methylbenzimidazole - 1 - tetraacetyl - d - glucopyranoside picrate, yellow needles from alcohol, M.Pt. 181.5–182° C. (decomp.)

5 - methylbenzimidazole - 1 - tetraacetyl - d - glucopyranoside formed needles from light petroleum containing a trace of alcohol, M.Pt. 177.5° C. $[\alpha]_D^{21} = -37.8°$.

Its hydrolysis (6 N HCl at 100° for 20 mins.) gave 5-methylbenzimidazole-1-d-glucopyranoside, needles from alcohol, M.Pt. 275–276° C. (decomp.) $[\alpha]_D^{25} = -33.6°$.

Example V 5-nitro-o-4-xylidine-d-glucoside was prepared as described by Kuhn and Strobele (see Example I), M. P. 221° C. (decomp.) and on acetylation gave the tetra-acetyl-deriv.

The crude mixture of glucosides obtained from the condensation (e. g. 8.7 g.) was treated without purification and in pyridine solution (115 ml.) with acetic anhydride (40 ml.) for 12 hrs. at room temperature. Excess anhydride was decomposed with alcohol. The product, on crystallisation from ethyl acetate gave 5-nitro-o - 4 - xylidine - tetraacetyl - d - glucopyranoside I yellow needles, M.Pt. 168–169° C. $[\alpha]_D^{23°} = -62°$. Yield 8.0 g.

The mother liquors yielded 5-nitro-o-4-xylidine-tetra-acetyl-d-glucopyranoside II yellow prismatic needles, M.Pt. 150–151° C. $[\alpha]_D^{23°} + 111°$.

Catalytic reduction of the series II isomer gave 5-amino-o-xylidine-tetraacetyl-d-glucopyranoside II, needles from alcohol, M.Pt. 131° C. $[\alpha]_D^{22} = -36.4°$.

Reaction of the foregoing base with ethyl orthoformate followed by treatment with N/10 HCl for 2 hrs. at 100° C. gave 5:6-dimethylbenzimidazole-1β-tetraacetyl-d-glucopyranoside as cream needles from benzene/light petroleum, M.Pt. 189–191° C. $[\alpha]_D^{23} = -35.7°$. Deacetylation of this compound gave 5:6-dimethylbenziminazole-1β-d-glucopyranoside, M. P. 246–248°.

Example VI 5-nitro-o-4-xylidine was condensed with l-arabinose and the crude l-arabinoside acetylated in the usual way. Fractionation gave 5-nitro-o-4-xylidine-triacetyl-l-arabopyranoside I golden yellow needles from alcohol/light petroleum, M.Pt. 213–214° C. $[\alpha]_D^{21} = +142°$ and 5-nitro-o-4-xylidine-triacetyl-l-arabopyranoside II M.Pt. 143–144° C. $[\alpha]_D^{21} = +2.6°$.

Reduction of either of the foregoing nitro-derivatives followed by reaction with ethyl orothoformate for 4 hrs., treatment with 0.05 N HCl for 2 hrs., and conversion to the picrate gave 5:6-dimethylbenzimidazole-1α-triacetyl-l-arabopyranoside picrate, as prismatic yellow needles from alcohol, M.Pt. 234–236° C. (decomp.). Percolation through alumina gave 5:6-dimethylbenzimidazole-1α-triacetyl-l-arabopyranoside, needles from benzene/light petroleum, M.Pt. 142–143° C. $[\alpha]_D^{25} = -31.9°$.

Hydrolysis of the foregoing compound with 2 N HCl gave 5:6 - dimethylbenzimidazole - 1α-l-arabopyranoside, needles from alcohol/light petroleum, M. Pt. 280–281° C. (decomp.). Its picrate formed yellow needles, M. Pt. 216–217° C. (decomp.) $[\alpha]_D^{23} = -70.5°$.

Example VII

By employing 5-nitro-o-4-xylidine and d-ribose as in previous examples 5:6-dimethylbenzimidazole-1β-d-ribopyranoside hydrochloride hemihydrate was obtained, as white needles, M. Pt. 229–230° C. (decomp.).

Example VIII

A mixture of 5-nitro-o-4-xylidine (15 g.) 1-rhamnose (7.5 g.) and ammonium chloride (400 mg.) in absolute alcohol 75 (ml.) was heated under reflux for 2½ hrs. Alcohol (75 ml.) was then added and the mixture allowed to cool. 5-nitro-o-4-xylidine-l-rhamnopyranoside separated on cooling as orange needles M. Pt. 193–195° C. (decomp.) which was used directly without further purification. Chromatography of the filtrate yielded a further 2.7 g. of rhamnoside and 10.0 g. of unused base.

Acetylation of the foregoing rhamnoside gave 5-nitro-o-4-xylidine-triacetyl-l-rhamnopyranoside, yellow cubes, M. Pt. 169° $[\alpha]_D^{23} = +101°$.

The foregoing triacetate (2.4 g.) was reduced in methanolic solution and the filtrate treated with ethyl orthoformate (7 ml.) for 5 hrs. on the steam bath. Evaporation to dryness under reduced pressure left a gum which was heated with N/10 HCl (20 ml.) for 30 mins. at 100° C., when the mixture was cooled and carefully neutralised with dilute sodium hydroxide solution. The precipitated solids were collected, dissolved in alcohol and treated with picric acid (1.5 g.) giving 5:6-dimethylbenzimidazole-1β-triacetyl-l-rhamnopyranoside picrate, yellow needles from aqueous alcohol, M. Pt. 184° C. By passing its solution in chloroform through alumina, 5:6-dimethylbenzimidazole-1β-triacetyl-l-rhamnopyranoside was obtained, as needles from chloroform/light petroleum, M. Pt. 92–95° C.

Hydrolysis of the foregoing compound gave 5:6-dimethylbenzimidazole - 1β - l - rhamnopyranoside as wispy white needles from alcohol/light petroleum, M. Pt. 252° C.

We claim:
1. A process for the manufacture of a benzimidazole glycoside of the general formula

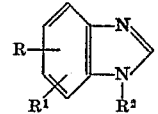

wherein R and R¹ are groups selected from the class consisting of H and CH₃ and R² is a sugar having in its molecular formula an acylated glycosido linkage which process comprises protecting at least one hydroxyl group of the glycosidic residue of an o-phenylenediamine of the general formula

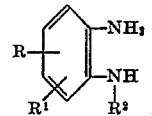

(where R, R¹ and R² have the same meaning as above), heating the resulting protected o-phenylenediamine derivative with ethyl orthoformate to give an ethyl isoformanilide and thereafter reacting the iso-formanilide with a source of hydrogen ions to effect ring closure, and removing the protecting group from the glycosidic residue.

2. A process as claimed in claim 1 wherein the source of hydrogen ions is hydrochloric acid.

3. A process as claimed in claim 1 wherein hydroxyl group protection is effected by acylation.

4. A process for the manufacture of 5-methylbenzimidazole-1-d-xylopyranoside which comprises heating 3-amino-p-toluidine-triacetyl-d-xylopyranoside with ethyl orthoformate and heating the resulting product with hydrochloric acid.

5. A process for the manufacture of 5-methylbenzimidazole-1-d-glucopyranoside which comprises reacting 3-amino-p-toluidine-tetraacetyl-d-glucopyranoside with ethyl orthoformate and heating the resulting product with hydrochloric acid.

6. A process for the manufacture of 5:6-dimethylbenzimidazole-1β-d-glucopyranoside which comprises reacting 5-amino-o-4-xylidene-tetraacetyl-d-glucopyranoside with ethyl orthoformate and heating the resulting product with hydrochloric acid.

7. A process for the manufacture of 5:6-dimethylbenzimidazole-1α-l-arabopyranoside which comprises reacting 5-amino-o-4-xylidene-triacetyl-l-arabopyranoside with ethyl orthoformate and heating the resulting product with hydrochloric acid.

8. A process for the manufacture of 5:6-dimethylbenzimidazole-1β-d-ribo-pyranoside which comprises reacting 5-amino-o-4-xylidene-triacetyl-d-ribopyranoside with ethyl orthoformate and reacting the resulting product with hydrochloric acid.

References Cited in the file of this patent

UNITED STATES PATENTS

| | | |
|---|---|---|
| 2,522,854 | Brink et al. | Sept. 19, 1950 |
| 2,606,187 | Hoffman | Aug. 5, 1952 |
| 2,644,817 | Holly et al. | July 7, 1953 |

OTHER REFERENCES

Karrer et al.: Helv. Chim. Acta V. 18, pages 70, 75, 77, 1438, 1439.